United States Patent [19]
Reinherz et al.

[11] Patent Number: 4,822,396
[45] Date of Patent: Apr. 18, 1989

[54] METHOD OF SHAPING A COATED GLASS SHEET ON A SHAPING DIE

[75] Inventors: Barry P. Reinherz, Lawrence; Robert M. Sullivan, Washington, both of Pa.

[73] Assignee: Ciba-Geigy Corporation, Ardsley, N.Y.

[21] Appl. No.: 220,334

[22] Filed: Jul. 14, 1988

Related U.S. Application Data

[63] Continuation of Ser. No. 120,460, Nov. 13, 1987, abandoned.

[51] Int. Cl.[4] .............................................. C034 23/02
[52] U.S. Cl. ....................................... 65/60.7; 65/24; 65/60.1; 65/62; 65/106
[58] Field of Search ................... 65/60.7, 60.1, 60.2, 65/62, 24, 106

[56] References Cited

U.S. PATENT DOCUMENTS

| | | | |
|---|---|---|---|
| 2,662,036 | 12/1953 | Levi | 65/60.7 X |
| 2,795,084 | 6/1957 | Littleton | 65/60.51 X |
| 2,943,963 | 7/1960 | Marini et al. | 65/62 X |
| 3,420,698 | 1/1969 | Smith | 65/60.7 X |
| 3,529,991 | 9/1970 | Shonebarger et al. | 65/24 X |
| 3,625,670 | 12/1971 | Ritter, Jr. | 65/106 |
| 3,650,720 | 3/1972 | Grego et al. | 65/60.7 X |
| 3,762,902 | 10/1973 | Wagner et al. | 65/62 X |
| 4,684,388 | 8/1987 | Boaz | 65/60.1 X |
| 4,684,389 | 8/1987 | Boaz | 65/24 |

Primary Examiner—Arthur Kellogg
Attorney, Agent, or Firm—Harry Falber

[57] ABSTRACT

In glass enamel coating compositions containing a glass frit system and a vehicle therefor, the improvement comprising the presence therein of iron, aluminum, zinc and tin sulfides or sulfates as an anti-stick agent; the resulting coatings being effective for application to glass sheets which are subsequently subjected to high temperature forming procedures.

2 Claims, No Drawings

METHOD OF SHAPING A COATED GLASS SHEET ON A SHAPING DIE

This application is a continuation of application Ser. No. 120,460, filed 11/13/87, now abandoned.

Glass enamel paint compositions are well known to those skilled in the art. These materials can be utilized for a variety of applications but are of particular use in decorating glass sheets. For example, the coating may be used to form borders around the edge of glass sheets which are converted into windshields, sidelites or backlites in motor vehicles.

It has been noted, however, that when glass sheets having the glass enamel coated thereon are subjected to a forming process at elevated temperatures, the prior art coatings exhibit a tendency to adhere to the materials covering the forming die. Accordingly, such prior art materials are unavailable for use in glass forming processes in which a heated glass sheet coated with the glass enamel is engaged by a material-covered forming die, generally a fiberglass-covered forming die.

Various approaches have been suggested in order to facilitate the forming of glass sheets with a glass enamel coated thereon, the withstanding of the elevated bending or forming temperatures and the repeated contact of the glass sheet and the covered forming die without having the enamel adhere to the forming die. For example, U.S. Pat. No. 4,596,590 discloses the addition of metal oxide powder, including cuprous oxide, to the paint composition to provide the desired non-stick barrier between the coating and the fiberglass-covered forming die. U.S. Pat. No. 4,684,388 and U.S. Pat. No. 4,684,389 disclose similar approaches, the former patent adding a mixture of finely divided zinc metal powder and finely divided stannous oxide powder as the anti-stick barrier and the latter patent adding finely divided zinc metal powder for the similar effect. Although each of these systems has been effective in reducing the indicated problem, greater reduction of adhesion and further improvement of surface appearnace are still desired.

It is the primary object of this invention to provide an improved glass enamel coating composition.

It is a further object to provide such coatings which are readily available for application to glass sheets and which exhibit anti-stick properties during glass formation.

Various other objects and advantages of this invention will become apparent from the following description thereof.

It has now been surprisingly discovered that by introducing iron, aluminum, zinc and tin sulfides or sulfates into glass enamel compositions, a number of the difficulties encountered with prior art formulations are substantially overcome. Thus, the resulting compositions can be readily applied to glass sheets and facilitate the formation of a smooth continuous coating which does not adhere to the fiberglass die coating when the heated coated glass is contacted with such materials. Accordingly, the bending or forming operations are not hindered by the above described sticking phenomenon.

The invention thus relates to the improved glass enamel composition and to the glass forming method utilizing such enamels. More specifically, the glass enamel compositions contain, as the primary ingredients, iron, aluminum, zinc and tin sulfides or sulfates, glass frit and vehicle. Iron sulfide is preferred for purposes of the invention.

Any conventional soft glass frit or frit mixtures can be utilized in the instant formulation. The frit will generally be ground to pass through 325 mesh screen (U.S. Standard Sieve size). The primary purpose of the frit is to bond the pigmentary product to the glass surface. The frit may comprise any appropriate combination of metal oxides. Typical oxides may be selected from the oxides of zinc, lead, silicon, titanium, zirconium, sodium, boron, lithium, potassium, calcium, aluminum, tin, vanadium, molybdenum, magnesium, iron, manganese and the like. Correspondingly, various fluorides may appear in the frit. The batch composition which will provide the above noted oxides and fluorides may contain various salts, such as oxides, carbonates, sulfates, nitrates, fluorides and the like, of the above noted metals. The batch ingredients are selected in order to achieve predetermined frit properties. Lead, zinc alkali and bismuth alkali borosilicate frits are preferred for purposes of this invention.

The frit is prepared by melting the batch ingredients at temperatures of from about 900° to 1600° C., and then quenching the molten glass either with the use of water or by pouring the melt between two cooled metal rolls rotating in opposite direction. Melting generally is conducted in a ceramic or platinum crucible or in an appropriately lined furnace. The resulting chips, chunks or flakes of frit are then ground into fine particles.

The vehicle is selected on the basis of the end use application. It is essential that the vehicle adequately suspend the particulates and burn off completely upon firing of the composition. Vehicles are typically organic and include pin oils, vegetable oils, mineral oils, low molecular weight petroleum fractions, and the like. The vehicles may be modified by viscous resins such as vinyl resins, solvents, film formers such as cellulosic materials, and the like.

The modified glass enamels contain from about 5–80% of sulfide or sulfate and preferably 10–40%; from about 10 to 85% glass frit and prefereably 25 to 50%; and from about 10 to 40% vehicle and preferably 15 to 30%. The percentages are based on the weight of the formulated glass enamel paste. The resulting compositions will be viscous in nature, the viscosity depending on application method and end use. For purposes of screen printing, viscosities ranging from 10,000–80,000, and preferably 35,000–65,000, centipoises at 20° C. as described on a Brookfield Viscometer, #7 spindle at 20 rpm are appropriate.

A wide variety of optional ingredients may be included in these formulations. These may be added for pigmentary purposes, to modify viscosity and to enhance properties such as bond strength and abrasion resistance. Various metal oxide pigments providing added black or gray pigmentation, e.g. black spinel pigments; bismuth and bismuth-containing compounds for bond strength; certain refractory materials such as zirconium oxide to increase abrasion resistance; suspending agents such as iso-stearic acid; and fumed silica and other silica products to modify viscosity; may be included for the indicated benefits. The metal oxide pigments are a preferred optional ingredient.

The compositions are prepared by blending the solid materials, adding the liquid ingredients thereto and then thoroughly mixing or kneading the two in order to form a smooth, thick paste. The paste is then further dispersed by means of a conventional machine such as a three-roll mill or dispersator such as a Cowles or Morehouse mill.

Methods for applying the enamel coatings are well known to those skilled in the art. The dispersed compositions may be applied by techniques such as screen printing, decal application, spraying, brushing, roller coating, and the like. Screen printing is preferred for purposes of applying the composition to glass substrates.

After the enamel has been applied to the glass sheet, the glass sheet is heated to a temperature which softens the glass sufficiently so that the glass sheet can be formed. Generally, this temperature is in a range of about 630°-760° C. Compositions which are formulated to be responsive to UV radiation may be exposed to such radiation prior to heating to bond the enamel to the glass sheet. After heating, the glass sheet and the enamel thereon are engaged by the fiberglass covered forming die to place the heated glass sheet into a desired shape. The heating operation, of course, burns off the organic materials contained in the enamel and bonds the remaining portion of the enamel to the glass sheet. The sulfide or sulfate addition to the enamel serves to prevent sticking of the enamel to the forming die and also provides a generally smooth continuous surface to the resulting enamelled surface.

After the forming die has been removed from engagement with the glass sheet and the enamel without any sticking of the enamel thereto, the glass sheet may be cooled to obtain a formed glass sheet with enamel thereon. Normally, the glass sheet is rapidly cooled in a glass tempering operation to achieve a tempered glass product having the enamel thereon. The resulting glass sheet is then readily available for use in a variety of applications, particularly the automotive applications noted hereinabove.

The following example further illustrates the embodiments of this invention. In this example, all parts are given by weight unless otherwise specified.

EXAMPLE 1

This example illustrates the preparation and application of typical enamels of this invention.

The following formulations are prepared:

The enamels are prepared by blending the liquid and solid ingredients and then dispersing the paste in an appropriate mill.

The performance characteristics of the enamels are determined in a laboratory screening procedure by applying the enamels to microscope slides, heating the slide to 705° C. for 15 minutes, impressing a slightly curved, ceramic cloth covered press bar at a estimated pressure of 25-50 pounds onto the softened glass for a period of five seconds with a rolling motion, removing the press bar and visually identifying the degree of adhesion between the enamel and the ceramic cloth. A rating of "0" is indicative of the absence of adherance; "1" indicates slight adherance; "2" indicates noticeable adherance; and "3" indicates significant adherance.

| Enamel | Rating | Surface Appearance |
| --- | --- | --- |
| 1 | 1-2 | hazy reddish-brown |
| 2 | 0-1 | hazy matte black |
| 3 | 0-1 | hazy matte black |
| 4 | 0-1 | hazy matte black |
| 5 | 0-1 | hazy, semi-gloss black |
| 6 | 0-1 | hazy matte black |
| 7 | 0-1 | hazy matte black |
| 8 | 1-2 | sl. hazy, roughened black surface |
| A* | 2 | rough black surface |
| B | 4 | clear, foggy |

*different test series

The haze appears to result from the testing method but is readily removable without permanent effect.

What is claimed is:

1. In the method for forming a glass enamel coated glass sheet, the glass enamel composition comprising a glass frit system and a vehicle therefor, wherein the glass enamel composition is coated onto the glass sheet, the coated glass sheet is heated to soften the sheet, to remove the volatiles in said enamel and to bond the remainder of the enamel to the sheet, the softened glass sheet is contacted with a fibrous material covered forming die, the forming die is removed and the glass sheet cooled; the improvement comprising incorporating into the enamel composition from about 5-80%, by weight, of a metal sulfide or sulfate selected from the group consisting of iron sulfide, iron sulfate, aluminum sulfide, aluminum sulfate, zinc sulfide, zinc sulfate, tin sulfide, tin sulfate and mixtures thereof.

2. The method of claim 1, wherein the enamel composition contains iron sulfide.

* * * * *

| | Parts | | | | | | | | | |
| --- | --- | --- | --- | --- | --- | --- | --- | --- | --- | --- |
| | 1 | 2 | 3 | 4 | 5 | 6 | 7 | 8 | A | B |
| Glass Frit (1) | 3.6 | — | — | — | 3.6 | — | — | — | — | 3.6 |
| Glass Enamel Powder (2) | — | 3.6 | 3.6 | 3.6 | — | 3.6 | 3.6 | 3.6 | 5.0 | — |
| Iron Cobalt Chromite Black Spinel Pigment | — | — | — | — | 0.4 | — | — | — | — | — |
| Pine Oil-Based Vehicle | 1.35 | 1.35 | 1.35 | 1.35 | 1.35 | 1.35 | 1.35 | 1.35 | 1.35 | 1.35 |
| Iron Sulfide | 0.8 | 0.8 | 1.0 | 1.2 | 1.0 | — | — | — | — | — |
| Zinc Sulfide | — | — | — | — | — | 0.8 | — | — | — | — |
| Aluminum Sulfide | — | — | — | — | — | — | 0.8 | — | — | — |
| Tin Sulfide | — | — | — | — | — | — | — | 0.8 | — | — |

| | Parts |
| --- | --- |
| (1) PbO | 53.24 |
| SiO$_2$ | 30.73 |
| ZrO$_2$ | 0.68 |
| Al$_2$O$_3$ | 3.13 |
| B$_2$O$_3$ | 9.66 |
| CdO | 2.56 |

(2) 58 parts lead-aluminum-borosilicate frit
42 parts black spinel pigment blend